(12) United States Patent
Park et al.

(10) Patent No.: US 11,591,445 B2
(45) Date of Patent: Feb. 28, 2023

(54) BARRIER FILM

(71) Applicant: LG CHEM, LTD., Seoul (KR)

(72) Inventors: Bo Ra Park, Daejeon (KR); Beom Gwon Son, Daejeon (KR); Hee Joon Jeong, Daejeon (KR); Jang Yeon Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/040,243

(22) PCT Filed: Apr. 25, 2019

(86) PCT No.: PCT/KR2019/005003
§ 371 (c)(1),
(2) Date: Sep. 22, 2020

(87) PCT Pub. No.: WO2019/209042
PCT Pub. Date: Oct. 31, 2019

(65) Prior Publication Data
US 2021/0001609 A1   Jan. 7, 2021

(30) Foreign Application Priority Data

Apr. 25, 2018 (KR) .................. 10-2018-0047791

(51) Int. Cl.
| | | |
|---|---|---|
| *C08J 7/048* | (2020.01) | |
| *C08J 7/04* | (2020.01) | |
| *C08G 77/54* | (2006.01) | |
| *C09D 183/16* | (2006.01) | |
| *C08G 77/62* | (2006.01) | |

(52) U.S. Cl.
CPC .............. *C08J 7/048* (2020.01); *C08G 77/54* (2013.01); *C08J 7/042* (2013.01); *C09D 183/16* (2013.01); *C08G 77/62* (2013.01)

(58) Field of Classification Search
CPC .......... C08J 7/048; C08J 7/042; C08J 7/0423; C08F 292/00; C09D 7/69
See application file for complete search history.

(56) References Cited

U.S. PATENT DOCUMENTS 10,654,070 B2    5/2020  Yang et al.
2006/0251905 A1  11/2006 Arakawa
(Continued)

FOREIGN PATENT DOCUMENTS

CN    1846988 A    10/2006
CN    105073413    11/2015
(Continued)

OTHER PUBLICATIONS

Machine translation (powered by EPO and Google) of JP2013-186236A, published Sep. 2013. (Year: 2013).*

(Continued)

*Primary Examiner* — Monique R Jackson
(74) *Attorney, Agent, or Firm* — Dentons US LLP

(57) ABSTRACT

Provided is a barrier film and a manufacturing method thereof. The barrier film has a structure comprising a polysilazane barrier layer, which can exhibit excellent running properties in a so-called roll-to-roll process or the like, and can maintain or improve the performance of the barrier layer even during an unwinding and/or winding process, and the like.

12 Claims, 2 Drawing Sheets

(56) References Cited

U.S. PATENT DOCUMENTS

| | | |
|---|---|---|
| 2013/0115423 A1 | 5/2013 | Ii et al. |
| 2014/0322478 A1* | 10/2014 | Mori ............... C08J 7/0427 428/76 |
| 2015/0099094 A1 | 4/2015 | Suzuki et al. |
| 2015/0166751 A1 | 6/2015 | Fukumoto et al. |
| 2015/0367602 A1 | 12/2015 | Iwaya et al. |
| 2016/0186009 A1* | 6/2016 | Goto ................. C08J 7/123 257/40 |
| 2017/0107344 A1 | 4/2017 | Iwaya et al. |
| 2017/0235025 A1* | 8/2017 | Harada ............... B32B 7/02 362/606 |
| 2018/0243789 A1 | 8/2018 | Yang et al. |
| 2019/0044094 A1 | 2/2019 | Nakayama |

FOREIGN PATENT DOCUMENTS

| | | |
|---|---|---|
| EP | 2410005 A1 | 1/2012 |
| EP | 2599621 A1 | 6/2013 |
| EP | 2839953 A1 | 2/2015 |
| EP | 3783399 A1 | 2/2021 |
| JP | H10-226011 | 8/1998 |
| JP | 2013-186236 | 9/2013 |
| JP | 2014-076590 | 5/2014 |
| KR | 10-2013-0032370 | 4/2013 |
| KR | 10-2014-0036049 | 3/2014 |
| KR | 10-2015-0000879 | 1/2015 |
| KR | 10-2016-0138447 | 12/2016 |
| KR | 10-2017-0113444 | 10/2017 |
| KR | 10-2017-0113451 | 10/2017 |
| KR | 10-2018-0016881 | 2/2018 |
| WO | WO-2010107018 A1 * | 9/2010 ............ C08J 7/047 |
| WO | 2013-175910 | 11/2013 |
| WO | 2017-170252 | 10/2017 |
| WO | 2017-171489 | 10/2017 |
| WO | 2017-179449 | 10/2017 |
| WO | WO-2019078069 A1 * | 4/2019 ............ B32B 27/36 |

OTHER PUBLICATIONS

Machine translation of JP WO2019078069A1, published Apr. 2019, powered by EPO and Google. (Year: 2019).*

* cited by examiner

BARRIER FILM

CROSS-REFERENCE TO RELATED APPLICATIONS

This application is a National Stage Application of International Application No. PCT/KR2019/005003 filed on Apr. 25, 2019, which claims priority to and benefit of Korean Patent Application No. 10-2018-0047791 filed on Apr. 25, 2018, the disclosure of which is incorporated herein by reference in its entirety.

TECHNICAL FIELD

The present application relates to a barrier film and a manufacturing method thereof.

BACKGROUND ART

Barrier films have been used for various applications including not only packaging materials of foods or medicines, and the like, but also display members such as LCD (liquid crystal display) and OLED (organic light emitting display), solar cell members or electronic paper, and the like.

The barrier film can be produced, for example, by forming a layer of a material having excellent gas and/or moisture barrier properties on a polymer film. For example, a dry coating method or a wet coating method can be applied to the formation of the layer.

The dry coating method includes so-called physical vapor deposition (PVD) and chemical vapor deposition (CVD), and the like. In the case of the dry coating method, a vacuum condition is required during the process, the process difficulty is high, and the cost is high.

The wet coating method has lower process difficulty than the dry coating method. Furthermore, since the wet coating method is applicable to a so-called roll-to-roll method, it is also advantageous to continuously mass-produce the barrier film.

However, in the roll-to-roll process, the film is often wound and/or unwound during the manufacturing process of the barrier film, and in this process, the barrier layer or the precursor layer of the barrier layer often causes deterioration of physical properties while contacting other layers. Furthermore, in order for the roll-to-roll process to proceed efficiently, running properties of the film also need to be improved.

DETAILED DESCRIPTION

Technical Problem

The present application provides a barrier film and a manufacturing method thereof. It is one object of the present application to provide a barrier film comprising an anti-blocking layer capable of maintaining or improving physical properties of a barrier layer formed even when it is in contact with the barrier layer or a precursor layer of the barrier layer and capable of improving running properties in a so-called roll-to-roll process, and a manufacturing method thereof. Particularly, it is one object of the present application to provide a barrier film which can effectively secure the above-described effects when the barrier layer is a so-called polysilazane barrier layer, and a manufacturing method thereof.

Technical Solution

Among physical properties mentioned in this specification, when the measured temperature and/or pressure affects the physical property value, the relevant physical property means a physical property measured at room temperature and/or normal pressure, unless otherwise specified.

In the present application, the term room temperature is a natural temperature without warming and cooling, which can mean, for example, any temperature in a range of about 10° C. to about 30° C., or a temperature of 25° C. or 23° C. or so.

In the present application, the term normal pressure is a pressure when it is not particularly reduced or increased, which can be about one atmosphere or so, usually atmospheric pressure.

The barrier film of the present application comprises a barrier layer. The barrier layer means a layer having barrier properties against moisture and/or gas. The barrier film of the present application comprises a barrier layer, whereby the barrier film can have predetermined transmittance against moisture and/or gas. For example, in this specification, the barrier layer can mean any kind of layer that allows moisture permeability (so-called WVTR (water vapor transmission rate)) of the barrier film to be maintained at $0.5 \times 10^{-3}$ g/m²·day. In another embodiment, the water vapor transmission rate can be $0.45 \times 10^{-3}$ g/m²·day or less, $0.4 \times 10^{-3}$ g/m²·day or less, $0.35 \times 10^{-3}$ g/m²·day or less, $0.3 \times 10^{-3}$ g/m²·day or less, $0.25 \times 10^{-3}$ g/m²·day or less, $0.2 \times 10^{-3}$ g/m²·day or less, $0.15 \times 10^{-3}$ g/m²·day or less, $0.1 \times 10^{-3}$ g/m²·day or less, $0.09 \times 10^{-3}$ g/m²·day or less, $0.08 \times 10^{-3}$ g/m²·day or less, $0.07 \times 10^{-3}$ g/m²·day or less, $0.06 \times 10^{-3}$ g/m²·day or less, or $0.05 \times 10^{-3}$ g/m²·day or less or so. The water vapor transmission rate means that the lower the numerical value is, the more excellent the barrier performance against moisture or humidity is, and thus the lower limit is not particularly limited. For example, the water vapor transmission rate can be 0 g/m²·day or more or more than 0 g/m²·day.

The barrier layer can be a so-called polysilazane barrier layer. The polysilazane barrier layer can mean a barrier layer comprising a polysilazane compound as a main component or a barrier layer formed of a material comprising a polysilazane compound as a main component. In this specification, the fact that a certain component is included in a certain object as a main component can mean that the weight ratio of the component in the relevant object is 55 weight % or more, 60 weight % or more, 65 weight % or more, 70 weight % or more, 75 weight % or more, 80 weight % or more, 85 weight % or more, 90 weight % or more, 95 weight % or more, and in this case, the upper limit of the ratio of the main component is 100 weight % or less, or less than 100 weight %. The barrier layer can realize the above-described moisture barrier properties by comprising a polysilazane compound. In the present application, the term polysilazane compound has a meaning including polysilazane or a derivative thereof. The polysilazane or a derivative thereof can form a thin film having, for example, a composition of SiOx (x is in a range of 1.2 to 2.0) to realize barrier properties against moisture and humidity. The polysilazane compound enables to realize barrier properties against moisture and humidity while forming a thin film having nano-sized silica domains.

The polysilazane compound, the barrier layer comprising the same or the precursor layer of the barrier layer can comprise, for example, a unit of Formula 1:

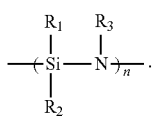

Formula 1

In Formula 1, $R_1$, $R_2$ and $R_3$ are each independently hydrogen, an alkyl group, an alkenyl group, an aryl group, or an alkoxy group.

The term "alkyl group" means an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group can be linear, branched or cyclic. The alkyl group can be exemplified by a linear or branched alkyl group such as a methyl group, an ethyl group, an n-propyl group, an isopropyl group, an n-butyl group, an isobutyl group, a sec-butyl group, a t-butyl group, an n-pentyl group, an isopentyl group, a neopentyl group, an n-hexyl group, an n-heptyl group or an n-octyl group, or a cycloalkyl group such as a cyclobutyl group, a cyclopentyl group, a cyclohexyl group or a cycloheptyl group, and the like. In addition, the alkyl group can be optionally substituted with one or more substituents.

The term "alkenyl group" means an alkenyl group having 2 to 20 carbon atoms, 2 to 16 carbon atoms, 2 to 12 carbon atoms, 2 to 8 carbon atoms or 2 to 4 carbon atoms, unless otherwise specified. The alkenyl group can be linear, branched or cyclic. The alkenyl group can be exemplified by a vinyl group, a 1-propenyl group, a 2-propenyl group, a 1-butenyl group, a 2-butenyl group or a 3-butenyl group, and the like. In addition, the alkenyl group can be optionally substituted with one or more substituents.

The term "aryl group" means a monovalent residue derived from a compound containing a benzene ring or a structure in which two or more benzene rings are condensed or bonded, or a derivative thereof, unless otherwise specified. In the range of the aryl group, a so-called aralkyl group or an arylalkyl group as well as a functional group ordinarily called an aryl group can be included. The aryl group can be, for example, an aryl group having 6 to 25 carbon atoms, 6 to 21 carbon atoms, 6 to 18 carbon atoms or 6 to 12 carbon atoms. The aryl group can be exemplified by a phenyl group, a phenoxy group, a phenoxyphenyl group, a phenoxybenzyl group, a dichlorophenyl group, a chlorophenyl group, a phenylethyl group, a phenylpropyl group, a benzyl group, a tolyl group, a xylyl group or a naphthyl group, and the like. In addition, the aryl group can be optionally substituted with one or more substituents.

The term "alkoxy group" means an alkoxy group having 1 to 20 carbon atoms, 1 to 16 carbon atoms, 1 to 12 carbon atoms, 1 to 8 carbon atoms or 1 to 4 carbon atoms. The alkoxy group can be linear, branched or cyclic. In addition, the alkoxy group can be optionally substituted with one or more substituents.

The substituent which can be optionally substituted in the alkyl group, alkylene group, aryl group or alkoxy group can be exemplified by halogen such as chlorine or fluorine, an epoxy group such as a glycidyl group, an epoxyalkyl group, a glycidoxyalkyl group or an alicyclic epoxy group, an acryloyl group, a methacryloyl group, an isocyanate group, a thiol group or a monovalent hydrocarbon group, and the like, but is not limited thereto. The term "monovalent hydrocarbon group" means a monovalent residue derived from a compound consisting of carbon and hydrogen or a derivative of such a compound, unless otherwise specified.

For example, the monovalent hydrocarbon group can contain 1 to 25 carbon atoms. As the monovalent hydrocarbon group, an alkyl group, an alkenyl group, an alkynyl group or an aryl group, and the like can be exemplified.

In Formula 1, n is an arbitrary number, and for example, n is a number of 2 to 50.

The Si—N bonding unit of polysilazane in the unit of Formula 1 can be converted into a bonding unit of Si—O in a curing process, for example, a curing process using light or plasma.

The barrier layer of the present application can also satisfy the following Equation 1:

$$0.75 \le d/(c+d) \le 0.97 \qquad \text{<Equation 1>}$$

In Equation 1, c means the number of Si—N bonding units present in the barrier layer, and d means the number of Si—O bonding units present in the barrier layer. The number of the bonding units can be, for example, the number of moles.

Equation 1 means the conversion ratio of polysilazane in the entire region of the barrier layer, where by comprising the barrier layer satisfying Equation 1 above in the barrier film, appropriate rigidity can be imparted to the barrier layer and simultaneously the desired barrier properties can be imparted thereto.

The thickness of the barrier layer can be selected as an appropriate range in consideration of the degree of thinning and optical characteristics, and the like, required for the barrier film, and it can have, for example, a thickness in the range of 10 nm to 500 nm, but is not limited thereto. In another embodiment, the thickness can be 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, 180 nm or more, 190 nm or more, 200 nm or more, 210 nm or more, 220 nm or more, 230 nm or more, 240 nm or more, 250 nm or more, 260 nm or more, 270 nm or more, 280 nm or more, 290 nm or more, or 300 nm or more, or can be 490 nm or less, 480 nm or less, 470 nm or less, 460 nm or less, 450 nm or less, 440 nm or less, 430 nm or less, 420 nm or less, 410 nm or less, 400 nm or less, 390 nm or less, 380 nm or less, 370 nm or less, 360 nm or less, 350 nm or less, 340 nm or less, 330 nm or less, 320 nm or less, 310 nm or less, or 300 nm or less or so. Particularly, the structure of the present application can be suitable when it has the polysilazane barrier layer in the thickness range as described above.

In this specification, the thickness of any layer can be the thickness of the thinnest portion or the thickness of the thickest portion in the relevant layer, or the average thickness of the relevant layer.

The barrier layer can further comprise an oxidizing agent. The oxidizing agent is a constitution that is contained in order to improve the speed of a curing process, which is described below, for example, an oxidation process using light or plasma, where all the known oxidizing agents can be used without any limitation, as long as they can achieve the above purpose, and the content can also be selected at an appropriate ratio.

For example, the oxidizing agent can be exemplified by peroxides ($H_2O_2$, $Na_2O_2$, $BaO_2$, $(C_6H_5CO)_2O_2$ and the like); hypochlorous acid (HClO); ozone water; ketone peroxides such as methyl ethyl ketone peroxide, methyl isobutyl ketone peroxide, cyclohexanone peroxide, methyl cyclohexanone peroxide or 3,3,5-trimethyl cyclohexanone peroxide; diacyl peroxides such as acetyl peroxide, propionyl peroxide, isobutyryl peroxide, octanoyl peroxide, 3,5,5-trimethylhexanoyl peroxide, decanoyl peroxide, lauroyl peroxide, benzoyl peroxide, p-chlorobenzoyl peroxide, 2,4-dichlorobenzoyl peroxide or acetylcyclohexanesulfonyl peroxide; hydroperoxides such as t-butyl hydroperoxide, cumene hydroperoxide, diisopropylbenzene hydroperoxide, p-menthane hydroperoxide, 2,5-dimethylhexane 2,5-dihydroperoxide or 1,1,3,3-tetramethylbutyl hydroperoxide; alkyl peroxides such as t-butyl peroxide, t-butyl-α-cumyl peroxide, di-α-cumyl peroxide, 2,5-dimethyl-2,5-bis(t-butylperoxy) hexane or 2,5-bis (t-butylperoxy)-3-hexyne; peroxyketals such as 1,1-bis(t-butylperoxy)-3,3,5-trimethylcyclohexane or 2,2-bis(t-butylperoxy)butane; peroxy esters such as t-butyl peroxy acetate, t-butylperoxy isobutyrate, t-butylperoxy octoate, t-butylperoxy pivalate, t-butylperoxy neodecanoate, t-butylperoxy-3,5,5-trimethyl hexanoate, t-butylperoxy benzoate, di-t-butylperoxy phthalate or 2,5-dimethyl-2,5-bis(benzoylperoxy) hexane; and the like.

The oxidizing agent can be included in the barrier layer in a ratio of, for example, 0.5 parts by weight to 5 parts by weight relative to 100 parts by weight of the polysilazane compound in the barrier layer, but is not limited thereto.

The barrier film comprises an anti-blocking layer. The anti-blocking layer can maintain or improve the barrier properties of the polysilazane barrier layer or the precursor layer even when the barrier film is wound and/or unwound, and also improve the running properties of the barrier film.

The anti-blocking layer can comprise particles having an average particle diameter in a range of 0.3 μm to 50 μm. In the present application, the term average particle diameter can mean a median particle diameter known in one embodiment as a so-called D50 particle diameter. By comprising particles having an average particle diameter in the above range, the anti-blocking layer can perform the functions and roles as described above. The average particle diameter of the particles can be 0.5 μm or more, 0.7 μm or more, 0.9 μm or more, 1 μm or more, 1.5 μm or more, 2 μm or more, 2.5 μm or more, 3 μm or more, 3.5 μm or more, 4 μm or more, 4.5 μm or more, 5 μm or more, 5.5 m or more, 6 μm or more, 6.5 μm or more, 7 μm or more, 7.5 μm or more, 8 μm or more, 8.5 μm or more, 9 μm or more, 9.5 μm or more, 10 μm or more, 11 μm or more, 12 μm or more, 13 μm or more, 14 μm or more, 15 μm or more, 16 μm or more, 17 μm or more, 18 μm or more, 19 μm or more, or 20 μm or more. The average particle diameter of the particles can also be, for example, 49 μm or less, 48 μm or less, 47 μm or less, 46 μm or less, 45 μm or less, 44 μm or less, 43 μm or less, 42 μm or less, 41 μm or less, 40 μm or less, 39 μm or less, 38 μm or less, 37 μm or less, 36 μm or less, 35 μm or less, 34 μm or less, 33 μm or less, 32 μm or less, 31 μm or less, 30 μm or less, 29 μm or less, 28 μm or less, 27 μm or less, 26 μm or less, 25 μm or less, 24 μm or less, 23 μm or less, 22 μm or less, 21 μm or less, 20 μm or less, 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, 7 μm or less, 6 μm or less, or 5 μm or less. By using particles having an average particle diameter satisfying the above range, excellent moisture barrier properties can be maintained and excellent running properties can be ensured, even when the barrier film is wound.

The anti-blocking layer comprises the above-mentioned particles, whereby the surface can be modified so that it can have good running properties. The surface of the anti-blocking layer can have, for example, a static friction coefficient in a range of 0.15 to 0.5. In another embodiment, the static friction coefficient can be 0.16 or more, 0.17 or more, 0.18 or more, 0.19 or more, 0.2 or more, 0.21 or more, 0.22 or more, or 0.23 or more, or can also be 0.49 or less, 0.48 or less, 0.47 or less, 0.46 or less, 0.45 or less, 0.44 or less, 0.43 or less, 0.42 or less, 0.41 or less, 0.40 or less, 0.39 or less, 0.38 or less, 0.37 or less, 0.36 or less, 0.35 or less, 0.34 or less, 0.33 or less, 0.32 or less, 0.31 or less, 0.30 or less, 0.29 or less, 0.28 or less, 0.27 or less, 0.26 or less, or 0.25 or less or so. Furthermore, the surface of the anti-blocking layer can have, for example, a kinetic friction coefficient in a range of 0.15 to 0.5, 0.15 to 0.4 or 0.2 to 0.3. In another embodiment, the kinetic friction coefficient can be 0.16 or more, 0.17 or more, 0.18 or more, 0.19 or more, 0.2 or more, 0.21 or more, 0.22 or more, or 0.23 or more, or can also be 0.49 or less, 0.48 or less, 0.47 or less, 0.46 or less, 0.45 or less, 0.44 or less, 0.43 or less, 0.42 or less, 0.41 or less, 0.40 or less, 0.39 or less, 0.38 or less, 0.37 or less, 0.36 or less, 0.35 or less, 0.34 or less, 0.33 or less, 0.32 or less, 0.31 or less, 0.30 or less, 0.29 or less, 0.28 or less, 0.27 or less, 0.26 or less, or 0.25 or less or so. As the friction coefficients satisfy the above ranges, when the barrier film is manufactured by a roll-to-roll process which is easy to mass-produce, the barrier film has excellent running properties, whereby the productivity can be improved.

The anti-blocking layer can exhibit a predetermined roughness characteristic. For example, the surface of the anti-blocking layer can have arithmetic mean roughness (Ra) in a range of 50 nm to 500 nm, 50 nm to 400 nm or 100 nm to 350 nm. In another embodiment, the arithmetic mean roughness (Ra) can be 55 nm or more, 60 nm or more, 65 nm or more, 70 nm or more, 75 nm or more, 80 nm or more, 85 nm or more, 90 nm or more, 95 nm or more, 100 nm or more, 105 nm or more, 110 nm or more, 115 nm or more, 120 nm or more, 125 nm or more, 130 nm or more, or 135 nm or more, or can also be 490 nm or less, 480 nm or less, 470 nm or less, 460 nm or less, 450 nm or less, 440 nm or less, 430 nm or less, 420 nm or less, 410 nm or less, 400 nm or less, 390 nm or less, 380 nm or less, 370 nm or less, 360 nm or less, or 350 nm or less or so.

Furthermore, the surface of the anti-blocking layer can have a maximum cross-sectional height (Rt) of the roughness curve in a range of 1 μm to 10 μm, 1 μm to 9 μm or 2 μm to 7 μm. In another embodiment, the maximum cross-sectional height (Rt) can be about 1.5 μm or more, about 2 μm or more, about 2.5 μm or more, about 3 μm or more, about 3.5 μm or more, about 4 μm or more, about 4.5 μm or more, or can also be about 9 μm or less, about 8 μm or less, about 7 μm or less, or about 6 μm or less or so.

As the surface of the anti-blocking layer has the roughness satisfying the above conditions, the above-described effects can be effectively ensured for the barrier film comprising the polysilazane barrier layer.

The kind of the particles is not particularly limited as long as the anti-blocking layer can satisfy the above-mentioned conditions. For example, the particles can be either or both of inorganic particles and organic particles. As one specific embodiment, the inorganic particles can be, for example, silica particles such as hollow silica particles or colloidal silica particles, but are not limited thereto.

The term "hollow silica particles" refers to silica particles derived from a silicon compound or an organic silicon compound, unless otherwise specified, the particles having a void space on the surface and/or in the inside of the silica particles.

The term "colloidal silica particles" means particles in which solid silica particles are stably dispersed in a liquid such as water or an organic solvent without precipitation or aggregation, unless otherwise specified.

The organic particles can be, for example, fine particles made of a styrene resin, an acrylic resin or an acrylate resin, but are not limited thereto.

In one embodiment, the anti-blocking layer can comprise the particles together with an acrylate unit as described below. In this case, the anti-blocking layer can comprise 0.05 parts by weight to 20 parts by weight of the particles relative to 100 parts by weight of the acrylate unit. In this specification, the part by weight can refer to a relative ratio of the mass of a component. The content of the particles can be, for example, 0.1 parts by weight or more, 0.15 parts by weight or more, 0.2 parts by weight or more, 0.25 parts by weight or more, 0.3 parts by weight or more, 0.35 parts by weight or more, or 0.4 parts by weight or more. The content of the particles can also be, for example, 10 parts by weight or less, 9 parts by weight or less, 8 parts by weight or less, 7 parts by weight or less, 6 parts by weight or less, 5 parts by weight or less, 4 parts by weight or less, 3 parts by weight or less, 2 parts by weight or less, 1 part by weight or less, 0.9 parts by weight or less, 0.8 parts by weight or less, 0.7 parts by weight or less, 0.6 parts by weight or less, or 0.5 parts by weight or less or so. As the content of the particles satisfies the above range, the anti-blocking layer can have excellent durability and transparency, while the surface thereof is modified.

The anti-blocking layer can comprise an acrylate unit. The term acrylate unit means a unit formed by polymerization of an acrylate compound. Thus, the inclusion of the acrylate unit in the anti-blocking layer can mean that the anti-blocking layer comprises a polymer, i.e., an acrylate polymer or a polymer comprising the acrylate unit. The acrylate unit, the acrylate polymer or the polymer comprising the acrylate unit can be included as a binder in the anti-blocking layer and can be included as a main component in the anti-blocking layer. Accordingly, the content of the acrylate unit, the acrylate polymer or the polymer comprising the acrylate unit in the anti-blocking layer can be 55 weight % or more, 60 weight % or more, 65 weight % or more, 70 weight % or more, 75 weight % or more, 80 weight % or more, 85 weight % or more, 90 weight % or more, or 95 weight % or more. Since the anti-blocking layer comprises particles, the content of the acrylate unit, the acrylate polymer or the polymer comprising the acrylate unit in the anti-blocking layer is less than 100 weight %. In the present application, (meth)acrylate refers to an acrylate and/or a methacrylate. In the present application, the term "acrylate unit" refers to a structure formed by polymerization of the acrylate compound. By applying the acrylate unit, the specific curing shrinkage behavior of the acrylate compound is adjusted together with an average particle diameter and a ratio of the particles and a ratio of a thickness and a particle diameter of the particles, which is described below, and the like, so that an anti-blocking layer having desired surface characteristics can be formed and a barrier film having excellent optical characteristics can also be provided.

The acrylate unit can be, for example, a polyfunctional acrylate unit. The term polyfunctional acrylate means an acrylate compound having two or more functional groups, as any one kind, selected from the group consisting of an acryloyl group, a methacryloyl group, an acryloyloxy group and a methacryloyloxy group. As such a polyfunctional acrylate, for example, one or more of bifunctional acrylates such as 1,4-butanediol di(meth)acrylate, 1,6-hexanediol di(meth)acrylate, neopentyl glycol di(meth)acrylate, polyethylene glycol di(meth)acrylate, neopentylglycol adipate di(meth)acrylate, hydroxypivalic acid neopentyl glycol di(meth)acrylate, dicyclopentanyl di(meth)acrylate, caprolactone modified dicyclopentenyl di(meth)acrylate, ethylene oxide modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide modified hexahydrophthalic acid di(meth)acrylate, tricyclodecane dimethanol (meth)acrylate, neopentyl glycol modified trimethylpropane di(meth)acrylate, adamantane di(meth)acrylate or 9,9-bis[4-(2-acryloyloxyethoxy)phenyl]fluorene; trifunctional acrylates such as trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate or tris(meth)acryloxyethyl isocyanurate; tetrafunctional acrylates such as diglycerin tetra(meth)acrylate or pentaerythritol tetra(meth)acrylate; pentafunctional acrylates such as propionic acid modified dipentaerythritol penta(meth)acrylate; and hexafunctional acrylates such as dipentaerythritol hexa(meth)acrylate, caprolactone modified dipentaerythritol hexa(meth)acrylate or urethane (meth)acrylate (e.g. a reaction product of an isocyanate monomer and trimethylolpropane tri(meth)acrylate) can be used. Preferably, the acrylate can be one or more of pentaerythritol (meth)acrylate and dipentaerythritol hexa(meth)acrylate.

In one embodiment, the anti-blocking layer can comprise a polyfunctional acrylate unit with tetrafunctionality or less (hereinafter, can be referred to as a first acrylate unit) and a polyfunctional acrylate unit with more than tetrafunctionality (hereinafter, can be referred to as a second acrylate unit). Here, the tetrafunctionality or less means that four or less functional groups, as any one kind, selected from the group consisting of an acryloyl group, a methacryloyl group, an acryloyloxy group and a methacryloyloxy group are included, where such an acrylate can be, for example, bifunctional to tetrafunctional acrylates.

In addition, here, the more than tetrafunctionality means that five or more functional groups, as any one kind, selected from the group consisting of an acryloyl group, a methacryloyl group, an acryloyloxy group and a methacryloyloxy group are included, where such an acrylate can be, for example, pentafunctional to decafunctional, pentafunctional to nonafunctional or pentafunctional to heptafunctional acrylates, or pentafunctional to hexafunctional acrylatates.

As the first acrylate unit, a unit having a molecular weight within a range of approximately 100 to 500 g/mol can be applied. The molecular weight can be the molecular weight of the acrylate compound forming the first acrylate unit. In another embodiment, the molecular weight can be 110 g/mol or more, 120 g/mol or more, 130 g/mol or more, 140 g/mol or more, 150 g/mol or more, 160 g/mol or more, 170 g/mol or more, 180 g/mol or more, 190 g/mol or more, 200 g/mol or more, 210 g/mol or more, 220 g/mol or more, 230 g/mol or more, 240 g/mol or more, 250 g/mol or more, 260 g/mol or more, 270 g/mol or more, 280 g/mol or more, or 290 g/mol or more, or can also be 490 g/mol or less, 480 g/mol or less, 470 g/mol or less, 460 g/mol or less, 450 g/mol or less, 440 g/mol or less, 430 g/mol or less, 420 g/mol or less, 410 g/mol or less, 400 g/mol or less, 390 g/mol or less, 380 g/mol or less, 370 g/mol or less, 360 g/mol or less, 350 g/mol or less, 340 g/mol or less, 330 g/mol or less, 320 g/mol or less, 310 g/mol or less, or 300 g/mol or less or so.

As the second acrylate unit, a unit having a molecular weight within a range of approximately 300 to 800 g/mol can be applied. The molecular weight can be the molecular weight of the acrylate compound forming the second acrylate unit. In another embodiment, the molecular weight can be about 310 g/mol or more, 320 g/mol or more, 330 g/mol or more, 340 g/mol or more, 350 g/mol or more, 360 g/mol or more, 370 g/mol or more, 380 g/mol or more, 390 g/mol or more, 400 g/mol or more, 410 g/mol or more, 420 g/mol or more, 430 g/mol or more, 440 g/mol or more, 450 g/mol or more, 460 g/mol or more, 470 g/mol or more, 480 g/mol or more, 490 g/mol or more, 500 g/mol or more, or 510 g/mol or more, or can also be 790 g/mol or less, 780 g/mol or less, 770 g/mol or less, 760 g/mol or less, 750 g/mol or less, 740 g/mol or less, 730 g/mol or less, 720 g/mol or less, 710 g/mol or less, 700 g/mol or less, 690 g/mol or less, 680 g/mol or less, 670 g/mol or less, 660 g/mol or less, 650 g/mol or less, 640 g/mol or less, 630 g/mol or less, 620 g/mol or less, 610 g/mol or less, 600 g/mol or less, 590 g/mol or less, 580 g/mol or less, 570 g/mol or less, 560 g/mol or less, 550 g/mol or less, 540 g/mol or less, or 530 g/mol or less or so.

In one embodiment, the anti-blocking layer can comprise a polymer comprising the acrylate unit together with the particles.

In one embodiment, the weight ratio of the polyfunctional acrylate unit with tetrafunctionality or less relative to the total weight of the anti-blocking layer excluding the particles can be 60 weight % or more. In another embodiment, the weight ratio can be about 60 weight % to 95 weight %, 60 weight % to 90 weight %, 60 weight % to 85 weight %, 65 weight % to 85 weight %, 70 weight % to 85 weight % or 75 weight % to 85 weight %. In another embodiment, the weight ratio can be 65 weight % or more, 70 weight % or more, or 75 weight % or more, or can also be 95 weight % or less, 90 weight % or less, or 85 weight % or less or so.

The anti-blocking layer can comprise 1 to 50 parts by weight of the polyfunctional acrylate unit with more than tetrafunctionality relative to 100 parts by weight of the polyfunctional acrylate unit with tetrafunctionality or less. In another embodiment, the ratio of the polyfunctional acrylate with more than tetrafunctionality can be about 5 parts by weight or more, 10 parts by weight or more, 15 parts by weight or more, or 20 parts by weight or more, and can be about 45 parts by weight or less, 40 parts by weight or less, 35 parts by weight or less, or 30 parts by weight or less or so.

When the acrylate units are contained in the above ratios, the specific curing shrinkage behavior of the acrylate compound forming the relevant acrylate unit is combined with the average particle diameter and the ratio of the particles as described above, so that the anti-blocking layer having desired surface characteristics can be effectively formed.

On the other hand, in the anti-blocking layer, the ratio (A/B) of the average particle diameter (A) of the particles to the thickness (B) of the anti-blocking layer can be in a range of 1.5 to 50.

In another embodiment, the ratio (A/B) can be about 45 or less, about 40 or less, about 35 or less, about 30 or less, or about 25 or less or so. In another embodiment, the ratio can also be about 2 or more, about 2.5 or more, about 3 or more, about 3.5 or more, about 4 or more, about 4.5 or more, or about 4 or more.

Here, the thickness can be the thickness of the thinnest part of the anti-blocking layer without particles, the thickness of the thickest part of the anti-blocking layer without particles, or the average thickness of the anti-blocking layer without particles.

By the materials and thickness ratios as described above, the effect intended in the present application can be further improved.

The acrylate unit can be an acrylate monomer unit formed by using a polyfunctional acrylate monomer in consideration of the durability of the barrier film and the like. The types of the above-mentioned polyfunctional acrylate monomers are the same as those described in the above-described types of polyfunctional acrylates.

The thickness of the anti-blocking layer is not particularly limited, but it can have, for example, a thickness of 0.1 μm to 100 μm. The thickness can be selected in consideration of the average particle diameter of the particles included in the anti-blocking layer and the roughness of the anti-blocking layer to be implemented. For example, in another embodiment, the thickness of the anti-blocking layer can be 0.2 μm or more, 0.3 μm or more, 0.4 μm or more, 0.5 μm or more, 0.6 μm or more, 0.7 μm or more, 0.8 μm or more, 0.9 μm or more, or 1 μm or more, or can also be 90 μm or less, 80 μm or less, 70 μm or less, 60 μm or less, 50 μm or less, 40 μm or less, 30 μm or less, 20 μm or less, 10 μm or less, 9 μm or less, 8 μm or less, 7 μm or less, 6 μm or less, 5 m or less, 4 μm or less, 3 μm or less, 2 μm or less, or 1.5 μm or less or so.

The barrier film of the present application comprises a functional layer. The functional layer can be located between the barrier layer and the anti-blocking layer. The functional layer can be, for example, one or more of a base layer and a buffer layer.

In a specific embodiment, the barrier film of the present application comprising the barrier layer, the anti-blocking layer and the functional layer can comprise an anti-blocking layer (100), a base layer (200) and a barrier layer (300), as shown in FIG. 1.

The base layer included in the barrier film of the present application serves as a support for the barrier layer, which can be selected in consideration of optical properties such as transparency or refractive indexes of light, impact resistance, heat resistance or durability, and the like, and as long as it is a polymer layer in a film or sheet type that can be used as an optical member such as a display device, it can be used without limitation.

As one specific embodiment, the base layer can be formed of a polyolefin such as polyethylene or polypropylene; a polyester such as polyethylene terephthalate or polyethylene naphthalate; a cellulose such as triacetylcellulose, diacetylcellulose, propionylcellulose, butylcellulose or acetylcellulose; a polyamide such as 6-nylon or 6,6-nylon; an acrylic polymer such as polymethyl methacrylate; or an organic polymer such as polystyrene, polyvinyl chloride, polyimide, polyvinyl alcohol, polycarbonate or ethylene vinyl alcohol, without being limited thereto. The base layer can be formed of one of the foregoing, or a mixture or polymer of two or more thereof, or can be of a structure in which a plurality of layers is laminated.

In addition, in the base layer, known additives, for example, an antistatic agent, an ultraviolet absorber, an infrared absorber, a plasticizer, a lubricant, a colorant, an antioxidant or a flame retardant, and the like can be included.

The base layer can be subjected to, for example, surface modification. Upon coating a composition for forming a barrier coating layer or a composition for forming a buffer layer, which is described below, the surface modification is performed in order to prevent a phenomenon such as separation of the coating film due to a lack of adhesive force of the film, which can be adopted by a treating method such as a chemical treatment, a corona discharge treatment, a mechanical treatment, an ultraviolet (UV) treatment, an active plasma treatment or a glow discharge treatment, but is not limited thereto.

The base layer can be set to have an appropriate thickness range in consideration of the transparency of the barrier film, film thinning and the purpose of minimizing occurrence of wrinkles due to tension upon processing, and the like, and for example, it is preferred to have 10 μm to 80 μm, or 20 μm to 60 μm, but is not limited thereto.

In order to minimize unevenness on the above-described base layer surface and to prevent cracks or the like due to the difference in thermal expansion coefficient between the base layer and the barrier layer, the barrier film of the present application can comprise a buffer layer between the base layer and the barrier layer.

That is, as shown in FIG. 2, the barrier film of the present application can comprise an anti-blocking layer (100), a base layer (200), a buffer layer (400) and a barrier layer (300).

The buffer layer is a constitution adopted for adjusting the surface roughness of the base layer to a predetermined range and preventing cracks due to the difference in thermal expansion coefficient between the base layer and the barrier layer, where known forming methods and materials capable of achieving the above objects can be adopted without limitation in the present application.

For example, the buffer layer can be formed using a metal such as Al, an inorganic material such as SiOx, SiOxNv, SiNx, AlOx, ZnSnOx, ITO, ZnO, IZO, ZnS, MgO or SnOx, an organic material such as polyimide, a cardo resin having a fluorene ring, urethane, epoxide, polyester, polyamic acid, polyimide, polyethyleneimine, polyvinyl alcohol, polyamide, polythiol, poly((meth)acrylate) or organic silicone, and the like. Furthermore, the buffer layer can also be formed using a material that is a compound such as an alkoxide or acylate of a metal such as zirconium, titanium or cerium is blended with a binder having a polar group such as a carboxyl group or a hydroxyl group.

In one embodiment, the buffer layer can comprise a polymer formed from a heat or ultraviolet curable radically polymerizable compound, for example, an acrylic polymer.

The acrylic polymer can comprise, for example, an acrylate unit. The acrylate can be, for example, alkyl (meth)acrylate, but is not limited thereto.

In one embodiment, the alkyl (meth)acrylate can be an alkyl (meth)acrylate having an alkyl group with 1 to 20 carbon atoms, and an example thereof can be exemplified by methyl (meth)acrylate, ethyl (meth)acrylate, n-propyl (meth)acrylate, isopropyl (meth)acrylate, isopropyl (meth)acrylate, n-butyl (meth)acrylate, t-butyl (meth)acrylate, isobutyl (meth)acrylate, 2-ethylhexyl (meth)acrylate, 2-ethylbutyl (meth)acrylate, pentyl (meth)acrylate, hexyl (meth)acrylate, cyclohexyl (meth)acrylate, n-octyl (meth)acrylate, isooctyl (meth)acrylate, isononyl (meth)acrylate, decyl (meth)acrylate, dodecyl (meth)acrylate, tridecyl (meth)acrylate, tetradecyl (meth)acrylate, octadecyl (meth)acrylate or isobornyl (meth)acrylate, and the like, but is not limited thereto.

The acrylic polymer can further comprise a polymerized unit of a monomer having a cross-linkable functional group.

The cross-linkable functional group is available without limitation as long as it can induce a crosslinking reaction in an acrylic polymer by a crosslinking agent, which can be, for example, a hydroxyl group, a carboxyl group, an isocyanate group, a glycidyl group, an epoxy group or an amine group, and the like.

The acrylic polymer can further comprise a polymerized unit of any other monomer as necessary for controlling the glass transition temperature or the crosslinking efficiency and the like. The kind or the ratio of such a monomer is not particularly limited, which can be appropriately selected from known components. An example of other optional monomers includes a nitrogen-containing monomer such as (meth)acrylonitrile, (meth)acrylamide, N-methyl (meth)acrylamide, N,N-dimethyl (meth)acrylamide, N-butoxymethyl (meth)acrylamide, N-vinylpyrrolidone or N-vinylcaprolactam; an alkylene oxide group-containing monomer such as alkoxy alkylene glycol (meth)acrylate, alkoxy dialkylene glycol (meth)acrylate or alkoxypolyethylene glycol (meth)acrylate; or a styrenic monomer such as styrene or methylstyrene, but is not limited thereto.

The acrylic polymer contained in the buffer layer can be cross-linked by a crosslinking agent. As the crosslinking agent, for example, a polyfunctional crosslinking agent can be used.

In the present application, the term "polyfunctional crosslinking agent" means a polyfunctional compound with bifunctionality or more comprising two or more functional groups capable of reacting with the cross-linkable functional group of the acrylic polymer in one molecule, for example, a polyfunctional compound comprising 2 to 6 functional groups in one molecule. The two or more functional groups contained in one molecule can be the same or different from each other.

In the present application, as the polyfunctional crosslinking agent, a compound can be used, which comprises, as the functional group capable of reacting with the cross-linkable functional group contained in the above-mentioned acrylic polymer, one or more, for example, one or two functional groups such as a carboxyl group, an acid anhydride group, a vinyl ether group, an amine group, a carbonyl group, an isocyanate group, an epoxy group, an aziridinyl group, a carbodiimide group or an oxazoline group.

The buffer layer can have a coefficient of thermal expansion (CTE) ranging from 50 ppm/°C. to 200 ppm/°C. Within the above range, it is possible to prevent cracks or the like due to the difference in thermal expansion coefficient between the base layer and the barrier layer.

The thickness of the buffer layer can be adopted as an appropriate range in consideration of film thinning of the barrier film, and for example, the thickness of the buffer layer can be in the range of 0.1 μm to 100 μm, but is not limited thereto. In another embodiment, the thickness of the buffer layer can be, for example, in the range of 0.1 μm to 100 μm or 1 μm to 90 μm, 10 μm to 80 μm or 20 μm to 70 μm, but is not limited thereto.

The present application also relates to a method for producing the barrier film. The method for producing a barrier film of the present application can comprise a step of applying a composition comprising a polysilazane compound on a base layer and then curing it to form a barrier layer.

The matters related to the polysilazane compound used in the method for producing a barrier layer of the present application are the same as those described in the section relating to the barrier film as described above, and thus will be omitted.

The step of forming a barrier layer on a base layer of the present application can comprise, for example, wet-coating a composition comprising a polysilazane compound on a base layer and then curing it.

The composition for forming a barrier layer can further comprise an oxidizing agent. The matters relating to the oxidizing agent are the same as those described in the section relating to the barrier film as described above, and thus will be omitted.

The composition for forming a barrier layer can further comprise a solvent. As the solvent, it is preferable to use an organic solvent hardly containing water, where the specific kind thereof can include for example, an alcoholic solvent such as methanol, ethanol, propanol, butanol, pentanol, hexanol, methyl cellosolve, butyl cellosolve, propylene glycol, diethylene glycol or carbinol, but is not limited thereto.

As the method of applying the composition for forming a barrier layer on the base layer, any well-known wet coating method can be used, which can include, for example, various application methods such as an ink jet method, a spin coating method, a casting method, a micro gravure coating method, a gravure coating method, a bar coating method, a roll coating method, a wire bar coating method, a dip coating method, a spray coating method, a screen printing method, a flexo printing method, an offset printing method, a micro contact printing method or a die coating method, and the present application can also combine one or more of these methods.

The method for producing a barrier film according to the present application can comprise a process of applying the composition for forming a barrier layer as described above on a base layer, followed by curing.

In one embodiment, the process of curing can comprise oxidizing the polysilazane compound contained in the applied composition for forming a barrier layer, and more specifically, converting Si—N contained in the polysilazane compound to Si—O to form ceramics. The curing can be performed using, for example, light or plasma.

In one embodiment, the curing can be performed by light irradiation, for example, by irradiating it with ultraviolet rays. The ultraviolet irradiation can be performed using, for example, vacuum ultraviolet rays of less than 2000 Å.

In one embodiment, the curing can be to perform a plasma treatment, such as a normal pressure or vacuum plasma treatment.

In the case of the treatment using vacuum plasma, it can comprise a process of disposing a known electrode or waveguide in a closed system maintained at a degree of vacuum of about 20 Pa to 50 Pa or so by a nitrogen gas, an oxygen gas, or a mixed gas thereof, and applying electric power such as a direct current, an alternating current, radio waves or micro waves through the electrode or waveguide to generate any plasma. In performing the plasma treatment, the treatment output, the treatment time or the treatment temperature and the like are known.

The method for producing a barrier film of the present application can comprise a step of applying a composition comprising an acrylate and particles having an average particle diameter in a range of 0.3 μm to 50 μm on the opposite side of the side on which a barrier layer is formed and then curing it to form an anti-blocking layer.

The matters relating to the acrylate contained in the composition are the same as those described in the section relating to the barrier film of the present application, and thus will be omitted.

As the method of applying the composition, any well-known wet coating method can be used, which can include, for example, various application methods such as an ink jet method, a spin coating method, a casting method, a micro gravure coating method, a gravure coating method, a bar coating method, a roll coating method, a wire bar coating method, a dip coater method, a spray coating method, a screen printing method, a flexo printing method, an offset printing method, a micro contact printing method or a die coating method, and the present application can also combine one or more of these methods.

The method for producing a barrier film according to the present application can comprise a process of applying the composition for forming anti-blocking layer as described above on a base layer, followed by curing.

In one embodiment, the process of curing can comprise initiating the radical polymerization of the acrylate contained in the applied composition for forming an anti-blocking layer to perform the polymerization reaction. The curing can be performed using, for example, light or heat.

In one embodiment, the curing can be performed by light irradiation, for example, by irradiating it with ultraviolet rays. The ultraviolet irradiation can be performed using, for example, vacuum ultraviolet rays of less than 2000 Å.

The method for producing a barrier film according to the present application can further comprise a step of forming a buffer layer having a coefficient of thermal expansion in a range of 50 ppm/° C. to 200 ppm/° C. on a base layer before the application process of the composition for forming a barrier layer.

As the material for forming the buffer layer, those mentioned in the above-mentioned barrier film can be used without limitation. In addition, the method of forming the buffer layer can be performed, for example, by applying a buffer layer forming material on the base layer using a known wet or dry coating method.

The present application also relates to an illuminating device. An exemplary illuminating device can comprise a light source and the barrier film. In one embodiment, the light source and the barrier film in the illuminating device can be disposed so that the light irradiated from the light source can enter the barrier film. Since the barrier film of the present application is excellent in optical properties such as light transmittance and haze as well as moisture barrier properties, it can serve to transmit the light emitted from the light source to the outside as well as to effectively block the moisture introduced into the light source.

The type of the light source included in the illuminating device of the present application is not particularly limited, and an appropriate type can be selected in consideration of the type of the desired light. In one embodiment, the light source is a blue light source, which can be, for example, a light source capable of emitting light in a wavelength range of 420 nm to 490 nm.

Furthermore, the present application can relate to an illuminating device comprising such a barrier film and a use thereof.

As the constitution and structure of the illuminating device comprising the barrier film, for example, all the known constitutions and structures comprising a light source and the barrier film, wherein the light source and the barrier film can be disposed such that the light irradiated from the light source can enter into the barrier film, can be used without limitation.

Specifically, the structures shown in FIGS. 3 and 4, and the like can be a structure of an illuminating device comprising a barrier film.

In FIG. 3, the light source (500) is disposed below the barrier film (1), whereby the light irradiated from the light source (500) in the upward direction can be incident on the barrier film (1).

FIG. 4 shows a case where the light source (500) is disposed on the lateral side of the barrier film (1). Although not essential, when the light source (500) is disposed on the lateral side of the barrier film (1) as described above, other means, such as a light guiding plate (700) or a reflective plate (600), can also be included, in which the light from the light source (500) can be efficiently incident on the barrier film (300).

The examples shown in FIGS. 3 and 4 are one embodiment of the illuminating device of the present application, and besides, the illuminating device can have various known forms and can further comprise various known constitutions for this purpose.

Such an illuminating device of the present application can be used for various applications.

As the use of the illuminating device, it can be used in, for example, a BLU (backlight unit) of a display device such as a computer, a mobile phone, a smart phone, a personal digital assistant (PDA), a gaming device, an electronic reading device or a digital camera, indoor or outdoor lighting, stage lighting, decorative lighting, accent lighting, or museum lighting, and the like, and besides, it can be used in special wavelength lighting required for horticulture or biology, and the like, but the application to which the illumination device can be applied is not limited to the above.

A typical application to which the illuminating device of the present application can be applied is a display device. For example, the illuminating device can be used as a BLU (backlight unit) of a display device such as an LCD (liquid crystal display).

Advantageous Effects

The present application provides a barrier film and a manufacturing method thereof. The barrier film has a structure comprising a polysilazane barrier layer, which can exhibit excellent running properties in a so-called roll-to-roll process or the like, and maintain or improve the performance of the barrier layer even in the winding and/or unwinding process, and the like.

EXAMPLES

Figure 1:
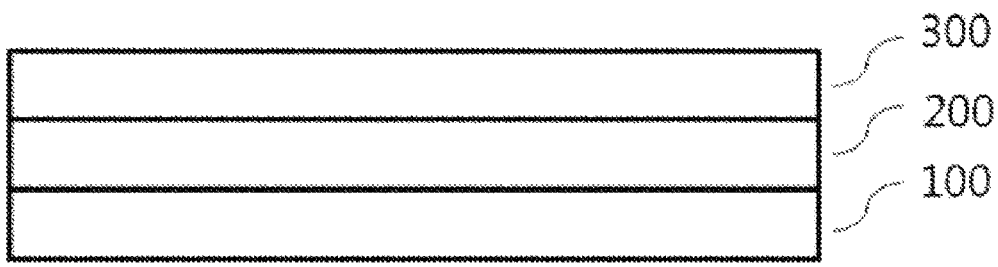
FIGS. 1 and 2 show structures of exemplary barrier films.
Figure 2:
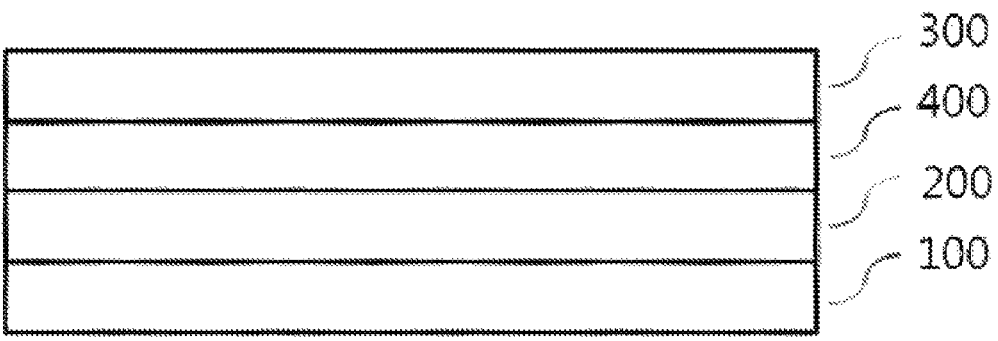
Figure 3:
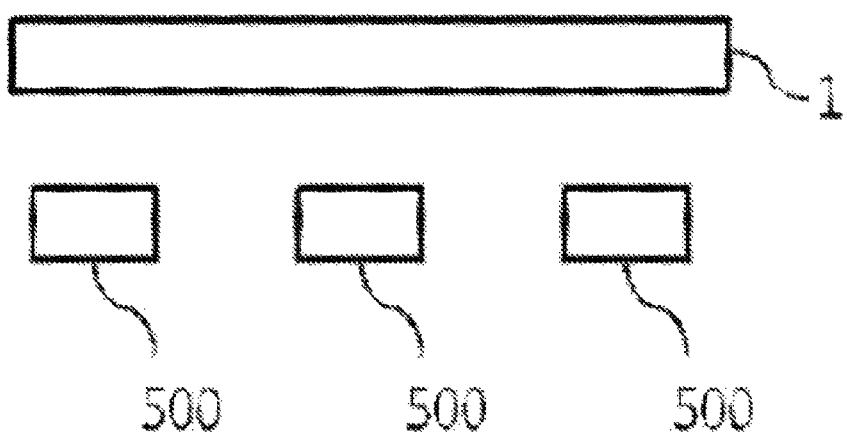
FIGS. 3 and 4 show structures of exemplary illuminating devices.
Figure 4:
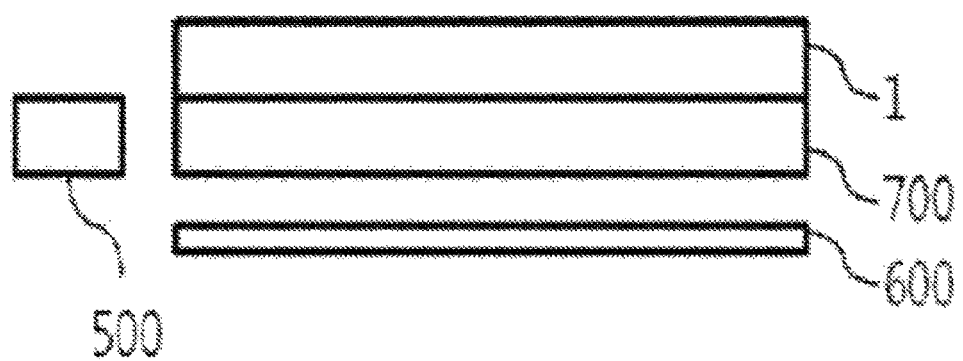

Hereinafter, the barrier film of the present application or the like will be described by way of examples, but the scope of the barrier film of the present application or the like is not limited to the following examples.

Test Example 1. Measurement of Water Vapor Transmission Rate

The water vapor transmission rates of the barrier films of Examples or Comparative Examples below were measured using an AQUATRAN2 instrument (MOCON) under conditions of a temperature of 30° C. and 100% relative humidity. The measurement results are shown in Table 1 below.

Test Example 2. Measurement of Surface Roughness

The surface roughness of the anti-blocking layers in the barrier films of Examples or Comparative Examples below was measured using a Nano view E1000 instrument (Nanosystem). The surface roughness was measured for any area region of 0.310 mm×0.232 mm on the surface of the anti-blocking layer. The results are shown in Table 1 below.

Test Example 3. Measurement of Friction Coefficient

The friction coefficients of the anti-blocking layers in the barrier films of Examples or Comparative Examples below were measured using an FP-2260 instrument (Thwing-Albert Instrument Company). The friction coefficient between the SUS (stainless steel) surface and the anti-blocking layer was measured using a sled weighing 200 g. The static friction coefficient was measured at a measuring speed of 18 cm/min for a region with a length of 8 cm, and the kinetic friction coefficient was measured at a measuring speed of 18 cm/min in a region of 5 cm.

Example 1

Production of Barrier Layer

A coating solution obtained by dissolving polysilazane in dibutyl ether was applied to a PET (poly(ethylene terephthalate)) film (T600E50, Mitsubishi) having a thickness of 50 m by a bar coating method, and the obtained coating film was maintained at 70° C. for 1 minute and at 130° C. for 2 minutes to form a polysilazane layer having a thickness of about 300 nm.

Production of Anti-Blocking Layer

Pentaerythritol triacrylate (PETA, trifunctionality, molecular weight: about 298.291 g/mol) and dipentaerythritol hexaacrylate (DPHA, hexafunctionality, molecular weight: about 524 g/mol) were dissolved in a solvent (propylene glycol monomethyl ether) in a weight ratio of 8:2 (PETA: DPHA). A coating solution was prepared by adding 4 parts by weight of a polymerization initiator (Irgacure 127, Ciba) and 0.4 parts by weight of particles (average particle diameter (D50 particle diameter): 5 μm, GB05S, Aica Kogyo) relative to 100 parts by weight of the total weight of PETA and DPHA thereto. The coating liquid was applied to the side without any polysilazane layer in the PET film that the polysilazane layer was formed on one side by a bar coating method, and the obtained coating film was maintained at 100° C. for 2 minutes and then cured through ultraviolet irradiation to form an anti-blocking layer having a thickness of about 1 μm or so.

Blocking Test

Two laminates thus prepared (polysilazane layer/PET film/anti-blocking layer) were cut to sizes of 20 cm and 30 cm, respectively. Subsequently, the anti-blocking layer of one laminate and the polysilazane layer of the other laminate were brought into contact with each other, and a load of 20 kg was applied thereto for 24 hours.

Manufacturing of Barrier Film

After the blocking test, the polysilazane layer was cured by a vacuum plasma curing method commonly used for curing polysilazane to produce a barrier film.

Example 2: Production of Barrier Film

A barrier film was produced in the same manner as in Example 1, except that particles (MX-2000, Soken) having an average particle diameter (D50 particle diameter) of 20 μm were applied instead of particles having an average particle diameter (D50 particle diameter) of 5 m at the time of preparing the coating solution for forming the anti-blocking layer.

Comparative Example 1. Production of Barrier Film

A barrier film was produced in the same manner as in Example 1, except that particles having an average particle diameter (D50 particle diameter) of 0.05 μm and particles having an average particle diameter of 0.1 μm were applied instead of particles having an average particle diameter (D50 particle diameter) of 5 μm at the time of preparing the coating solution for forming the anti-blocking layer.

Comparative Example 2. Production of Barrier Film

A barrier film was produced in the same manner as in Example 1, except that particles having an average particle diameter (D50 particle diameter) of 0.1 μm were applied instead of particles having an average particle diameter (D50 particle diameter) of 5 μm at the time of preparing the coating solution for forming the anti-blocking layer.

TABLE 1

| | Water vapor transmission rate ($10^{-3}$ g/ $m^2 \cdot$ day) | Ra (μm) | Rt (μm) | Static friction coefficient | Kinetic friction coefficient |
|---|---|---|---|---|---|
| Example 1 | 0.05 or less | 0.14 | 3.14 | 0.24 | 0.25 |
| Example 2 | 0.05 or less | 0.34 | 5.13 | 0.23 | 0.23 |
| Comparative Example 1 | 1.11 | 0.009 | 0.43 | 0.27 | 0.25 |
| Comparative Example 2 | 0.57 | 0.012 | 0.74 | 0.28 | 0.29 |

The invention claimed is:

1. A barrier film, comprising:
a barrier layer;
an anti-blocking layer; and
a functional layer between the barrier layer and the anti-blocking layer, wherein:
the barrier layer is a polysilazane barrier layer, and
the anti-blocking layer comprises an acrylate unit and particles having an average particle diameter in a range from 0.3 μm to 50 μm, and
the anti-blocking layer has a thickness of 0.2 μtm to 100 μm, and
a surface of the anti-blocking layer facing away from the functional layer has arithmetic mean roughness (Ra) in a range of 50 nm to 500 nm and a maximum cross-sectional height (Rt) in a range of 1 μm to 10 μm.

2. The barrier film according to claim 1, wherein the functional layer is at least one of a base layer and a buffer layer.

3. The barrier film according to claim 1, wherein the polysilazane barrier layer comprises a polysilazane compound comprising a unit of Formula 1:

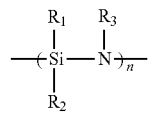

Formula 1 wherein;
$R_1$, $R_2$ and $R_3$ are each independently hydrogen, an alkyl group, an alkenyl group, an aryl group, or an alkoxy group; and
n is an arbitrary number.

4. The barrier film according to claim 3, wherein the polysilazane compound has been oxidized to convert a portion of the Si-N bonding units to Si-O.

5. The barrier film according to claim 1, wherein the barrier layer has a thickness in a range from 10 nm to 500 nm.

6. The barrier film according to claim 1, wherein the weight ratio of the polyfunctional acrylate unit with tetrafunctionality or less is 60 weight % or more relative to the total weight of the anti-blocking layer excluding the particles.

7. The barrier film according to claim 6, wherein the anti-blocking layer comprises 1 to 50 parts by weight of the polyfunctional acrylate unit with more than tetrafunctionality relative to 100 parts by weight of the polyfunctional acrylate unit with tetrafunctionality or less.

8. The barrier film according to claim 1, wherein the surface of the anti-blocking layer facing away from the functional layer has a static friction coefficient between a stainless steel surface and the anti-blocking layer measured using a sled weighting 200 g at a measuring speed of 18 cm/min for a region with a length of 8 cm that is in a range of 0.15 to 0.5.

9. The barrier film according to claim 1, wherein the surface of the anti-blocking layer facing away from the functional layer has a kinetic friction coefficient between a stainless steel surface and the anti-blocking layer measured using a sled weighing 200 g at a measuring speed of 18 cm/min for a region with a length of 5 cm that is in a range of 0.15 to 0.5.

10. The barrier film according to claim 1, wherein the ratio (AB) of the average particle diameter (A) of the particles to the thickness (B) of the anti-blocking layer is in a range of 1.5 to 50.

11. An illuminating device, comprising:
a light source and the barrier film of claim 1.

12. A display device, comprising:
the illuminating device of claim 11.

* * * * *

UNITED STATES PATENT AND TRADEMARK OFFICE
CERTIFICATE OF CORRECTION

| | |
|---|---|
| PATENT NO. | : 11,591,445 B2 |
| APPLICATION NO. | : 17/040243 |
| DATED | : February 28, 2023 |
| INVENTOR(S) | : Bo Ra Park et al. |

It is certified that error appears in the above-identified patent and that said Letters Patent is hereby corrected as shown below:

In the Claims

Please replace Claim 1 at Column 17 Line 28-48 with the following:
—1. A barrier film, comprising:
    a barrier layer; an anti-blocking layer; and
    a functional layer between the barrier layer and the anti-blocking layer,
wherein:
    the barrier layer is a polysilazane barrier layer, and
    the anti-blocking layer comprises an acrylate unit and particles having an average particle diameter in a range from 5.5 µm to 50 µm, and
    the acrylate unit comprises a polyfunctional acrylate unit with tetrafunctionality or less and a polyfunctional acrylate unit with more than tetrafunctionality, and
    the anti-blocking layer has a thickness of 0.2 µm to 100 µm, and
    a surface of the anti-blocking layer facing away from the functional layer has arithmetic mean roughness (Ra) in a range of 50 nm to 500 nm and a maximum cross-sectional height (Rt) in a range of 1 µm to 10 µm.—

Please replace Claim 8 at Column 18 Line 28-34 with the following:
—8. The barrier film according to claim 1, wherein the surface of the anti-blocking layer facing away from the functional layer has a static friction coefficient between a stainless steel surface and the anti-blocking layer measured using a sled weighing 200 g at a measuring speed of 18 cm/min for a region with a length of 8 cm that is in a range of 0.15 to 0.5.—

Please replace Claim 10 at Column 18 Line 42-44 with the following:
—10. The barrier film according to claim 1, wherein the ratio (A/B) of the average particle diameter (A) of the particles to the thickness (B) of the anti-blocking layer is in a range of 1.5 to 50.—

Signed and Sealed this
Fourth Day of April, 2023

Katherine Kelly Vidal
*Director of the United States Patent and Trademark Office*